Patented Jan. 1, 1935

1,986,116

UNITED STATES PATENT OFFICE 1,986,116

OIL-SOLUBLE AZO DYE

Ralph B. Payne, Elma, N. Y., assignor to National Aniline & Chemical Company, Inc., New York, N. Y., a corporation of New York No Drawing. Application December 21, 1932, Serial No. 648,217

14 Claims. (Cl. 260—84)

This invention relates to oil soluble azo dyes. It relates more particularly to secondary azo dyestuffs soluble in benzene and other organic solvents and to compositions containing the same.

It has heretofore been proposed to color material by means of a secondary azo dye resulting from the coupling of beta-naphthol in alkaline solution with a diazotized aminoazoxylene obtainable from a technical xylidine, that is, a mixture of isomeric aminoxylene compounds resulting from the nitration and reduction of the xylene fraction of coal tar distillate generally having a boiling point range of about 137.5° to 140.5° C., which mixture generally contains a large proportion of meta- and/or para-xylidine and only a comparatively small proportion of ortho-xylidine. The resulting products, however, have the objection that they are not soluble in benzene and other organic solvents to a satisfactory extent; so that ordinarily solutions of the desired concentration but free from insoluble matter cannot be obtained, and, moreover, when concentrated solutions of the products are prepared some of the product settles out upon standing.

One use for which the said dye has been proposed is in the coloring of gasoline. Gasoline containing lead tetraethyl is usually colored to distinguish it from other gasolines in view of the highly poisonous character of the lead compound. The coloring agent is preferably added to the gasoline in the form of a concentrated solution in a solvent which is readily miscible with gasoline, such as benzene. In order satisfactorily to color gasoline containing lead tetraethyl dissolved therein, it is apparent that the coloring agent should be fast to light, should be unaffected by lead tetraethyl, should be soluble in benzene, and other hydrocarbons and other suitable solvents (such as ethylene dibromide, etc.), to a sufficient extent to form a satisfactory concentrated solution from which the coloring agent does not separate out and which has high tinctorial coloring power, so that upon high dilution with gasoline the coloring agent will be present in solution in sufficient quantities to impart a definite, easily discernible color.

While the product resulting from the coupling of beta-naphthol with diazotized aminoazoxylene prepared from the technical xylidine is a red dyestuff of satisfactory fastness to light, it does not dissolve in oily solvents such as benzene to a sufficient extent to produce stable solutions containing the desired concentrations of coloring matter. Although in some cases concentrated solutions of the product in benzene or other solvent may be initially obtained, a part of the coloring matter separates upon standing.

According to the present invention, new dyestuffs are obtainable by coupling beta-naphthol with an aminoazoxylene which is obtainable from o-xylidine or a mixture of xylidines containing a large proportion of o-xylidene.

The invention accordingly comprises the products having the properties and characteristics, and the steps and their relation employed in the preparation of the products, all of which are exemplified in the products and processes hereinafter disclosed. The scope of the invention is indicated in the appended patent claims.

In preparing the dyestuffs of the present invention, in accordance with a preferred method of procedure, the alkali metal salt of beta-naphthol is coupled in an alkaline coupling medium, such as, aqueous sodium carbonate solution, with a diazotized aminoazoxylene of which not less than 50 per cent. of the xylyl radicals are derivatives of o-xylene (for example, diazotized aminoazo-o-xylene itself, or a mixture of diazotized aminoazoxylenes of which not less than 50 per cent. of the xylyl radicals are derivatives of o-xylene—that is, o-xylyl radicals).

The aminoazoxylene may be prepared in any suitable manner from o-xylidine or a suitable mixture of xylidines. Thus it may be prepared by the method usually employed for the preparation of other aminoazo bodies of the benzene series; for example, by treating 2.5 to 3 mols of the xylidine with about 1 mol of sodium nitrite in the presence of an excess of hydrochloric acid at a temperature of about 20° to about 35° C., rearranging the resulting diazoaminoxylene to aminoazo-o-xylene by maintaining the mixture, resulting from the diazotization and combination, at a temperature of 20° to 30° C. for almost 24 hours and then at a temperature of 50° to 60° C. until rearrangement is complete, separating the resulting aminoazo-o-xylene in the form of the hydrochloride, and washing it with dilute hydrochloric acid until free from xylidine.

The xylidine employed for the preparation of the aminoazo-o-xylene may be o-xylidine, or it may be a mixture of xylidines containing a major proportion of o-xylidine and a minor proportion of meta- and/or para-xylidines. A mixture of xylidines containing in excess of 70 per cent., and particularly in excess of 90 per cent., of o-xylidines, based on the weight of the mixed xylidines, is preferably employed. One form of xylidine found to be of value in the preparation of the products of the present invention comprises an o-xylidine which may be obtained by treating a commercial or technical xylidine which contains a large proportion of meta and/or para-xylidines and a small proportion of o-xylidines with acetic acid to precipitate the meta-xylidine as the acetate, filtering off the precipitate, treating the resulting filtrate with hydrochloric acid to percipitate para-xylidine as the hydrochloride, and filtering off the resulting precipitate from the remaining solution of o-xylidine hydrochlorides (as described for example in Journal of the Chemical Society (London), vol. 77, p. 65 (1900)). Another form of o-xylidine found to be of value for the preparation of the products of the present invention comprises an o-xylidine which is obtainable by the nitration and subsequent reduction of a xylene fraction of coal tar distillate having a boiling point range of about 140° to about 145° C., and preferably a xylene fraction of coal tar distillate of which 95 per cent. boils within the range of 142° to 145.5° C.; for example a coal tar distillate having the following composition:

| Hydrocarbon | o-xylol | m-xylol | p-xylol | Paraffins |
| --- | --- | --- | --- | --- |
| Percent | 82.6 | 6.0 | 1.9 | 9.5 |

The nitration of the xylene and the subsequent reduction of xylidine may be carried out in accordance with the usual practice in the art for the production of xylidine from xylene.

The dyestuffs produced in accordance with the present invention are xylyl-azo-xylyl-azo-beta-naphthols having in the free state the probable formula:

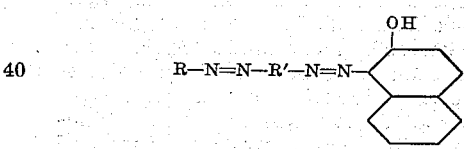

in which R and R' represent the same or different xylyl radicals, at least one of which is an o-xylyl radical, or they are mixtures of isomeric xylyl-azo-xylol-azo-beta-naphthols in which at least 50, and preferably more than 70, per cent. of the xylyl radicals of the mixture are o-xylyl radicals.

The following examples will serve to illustrate the invention, but it will be evident to one skilled in the art that the invention is not limited thereto, and that changes may be made in the materials treated, proportions of ingredients, method of procedure, reaction conditions, order of steps and other details without departing from the scope of the appended patent claims. The parts are by weight.

*Example 1*

*Part A.*—A technical xylidine, consisting mainly of a mixture of meta- and para-xylidines and containing a minor proportion of o-xylidines, is treated to recover the o-xylidines as a separate fraction in the form of the hydrochlorides by treatment with acetic acid followed by treatment with hydrochloric acid, and the resulting fraction of o-xylidine hydrochlorides is converted to the corresponding mixture of aminoazo-o-xylenes by diazotization, combination, and rearrangement, all as more particularly described above.

*Part B.*—Beta-naphthol (175 parts) is dissolved in an aqueous solution of sodium hydroxide (55 parts of sodium hydroxide dissolved in 3000 parts of water), and to the solution there are added 240 parts of soda ash and 1500 parts of ice. Aminoazo-o-xylene hydrochloride (315 parts), produced in accordance with the process of Part A, is dissolved in dilute hydrochloric acid (360 parts of 20° Bé. hydrochloric acid and 1000 parts of water) and is diazotized, while maintaining the temperature at about 10° to 12° C. by the addition of ice (about 500 parts), by adding thereto sufficient sodium nitrite to completely diazotize it (about 80 parts of sodium nitrite dissolved in about 240 parts of water). When the diazotization is complete, water is added to dilute the diazo solution (to a weight of about 6000 parts) and the diluted diazo solution is slowly added (over a period of about 1 hour) to the alkaline solution of beta-naphthol while maintaining the temperature at about 5° C., whereby coupling of the diazotized aminoazo-o-xylene with the beta-naphthol takes place. During the coupling an excess of sodium carbonate and of beta-naphthol is maintained in the coupling medium at all times by the addition of one or both of said compounds, as and if required. When the coupling is complete the reaction mixture is heated to about 35° C. and the precipitated dyestuff is filtered off and washed with water until free from alkali and chlorides. If desired the dyestuff may be dried at 80° C. The resulting product in the dry state is a bronzy, brownish powder insoluble in water, soluble in concentrated sulfuric acid to give a bluish green solution which, upon dilution with water, turns red and precipitates to a greater or less extent, and soluble in benzene to give a red solution.

As compared with the product made from an aminoazoxylene mixture containing only a small amount of o-xylyl radicals, such as is obtainable from the mixed or technical xylidine employed as initial material in this example, the product of the example is more completely soluble in benzene.

*Example 2*

*Part A.*—To well agitated, cooled, high boiling xylene (1000 parts of a xylene fraction of a coal tar distillate having a boiling range of 142.5° to 145° C., and consisting mainly of o-xylene) there is added mixed nitrating acid (3300 parts of a mixed acid containing 17 per cent. nitric acid, 65 per cent. sulfuric acid, and 18 per cent. water) at such a rate that the temperature of the reaction mixture does not rise above 15° C. The mixture is agitated with cooling until the nitration is completed, the resulting mass is allowed to stratify, and the spent acid is drawn off from the upper oily layer containing the nitro xylene. The oil, which consists mainly of nitro-o-xylenes together with small amounts of other isomeric nitro xylenes, is then washed with dilute sodium carbonate solution and finally with water.

*Part B.*—A mixture of water (100 parts), hydrochloric acid (117 parts of 20° Bé. acid), and nitro-o-xylene resulting from the process of Part A (720 parts) is heated and refluxed with agitation in a jacketed iron kettle provided with suitable agitating means and a reflux condenser. Ground iron (967 parts) is gradually added to the agitated mixture (over a period of two to three hours), and after addition of iron is completed, live steam is passed into the reaction mass to continue the refluxing (for about 2.5 hours). The reaction mass is then neutralized by addition of hydrated lime, and the resulting xylidine product is recovered by distillation from the reaction mass by indirect heat with the aid of a vacuum (28—29 inches gauge pressure). Water is separated from the resulting distillate and the xylidine product is purified by redistillation with the aid of a vacuum (28—29 inches gauge pressure). That portion of the distillate is separately collected which is completely soluble in 20° Bé. hydrochloric acid. The resulting xylidine product (which consists mainly of a mixture of o-xylidines) is a reddish-brown liquid, of which 90 to 95 per cent. boils within a range of 219° to 244° C. at atmospheric pressure.

Part C.—To an agitated solution of an o-xylidine product resulting from the process of Part B (132 parts of the reddish-brown liquid) in hydrochloric acid (43.8 parts, sp. gr. 1.18) there is slowly added a solution of sodium nitrite (28.8 parts) in water (60 parts) while maintaining the temperature within the range 20°-35° C. After the nitrite is all added, the reaction mixture is maintained at about 25° to about 35° C. for about fifteen hours; it is then heated to about 60° C. and maintained at said temperature for a further period of about three hours. Upon completion of the reaction, the reaction mixture is cooled to about 45° C. and hydrochloric acid (315 parts, sp. gr. 1.10) is slowly added. After stirring for about one hour, the reaction mass is added to water (80 parts), the mixture is agitated to complete precipitation (ten to fifteen hours), and the resulting aminoazoxylene hydrochloride mixture is filtered off and washed with dilute hydrochloric acid, to remove any unreacted xylidine. The resulting filter cake, which consists mainly of hydrochlorides of a mixture of isomeric aminoazoxylenes of which the xylyl radicals are mainly derivatives of o-xylene, may be employed in the subsequent operations in the form of a paste, or it may be dried under vacuum at about 50° C.

Part D.—The aminoazoxylene hydrochloride resulting from the process of Part C is coupled with beta-naphthol in accordance with the process of Example 1, Part B. The resulting dyestuff is similar in properties to the dyestuff of Example 1, Part B.

As has been pointed out, the invention is not limited to the details of the above specific examples but various changes may be made, as will be evident to one skilled in the art. Furthermore, while the dyestuffs of the present invention are of particular value in the coloring of gasoline containing lead tetraethyl, they are not limited in their application to such use, and in view of their solubility in organic solvents, they may be employed to color oil varnishes, wood stains, resinous compositions, cellulose and other lacquers, etc.

I claim:

1. The process of making an azo dye soluble in oil which comprises diazotizing an aminoazoxylene of which not less than 50 per cent. of the xylyl radicals are derivatives of o-xylene, and coupling the resulting diazo compound with beta-naphthol.

2. The process of making an azo dye soluble in oil which comprises diazotizing a mixture of aminoazoxylenes of which not less than 50 per cent. of the xylyl radicals are derivatives of o-xylene, and coupling the resulting diazotized product with beta-naphthol in an aqueous alkaline solution.

3. The process of making an azo dye soluble in oil which comprises coupling beta-naphthol in an aqueous alkaline solution with a diazotized aminoazoxylene mixture, resulting from the diazotization, combination, and rearrangement of a xylidine mixture containing not less than 50 per cent. of o-xylyl derivatives based upon the weight of the mixed xylidines.

4. The process of making an azo dye soluble in oil which comprises coupling beta-naphthol in an aqueous alkaline solution with a diazotized aminoazoxylene mixture, resulting from the diazotization, combination, and rearrangement of a xylidine mixture containing in excess of 70 per cent. of o-xylyl derivatives based upon the weight of the mixed xylidines.

5. The process of making an azo dye soluble in oil which comprises coupling beta-naphthol in an aqueous alkaline solution with a diazotized aminoazoxylene mixture, resulting from the diazotization, combination, and rearrangement of a xylidine mixture containing in excess of 90 per cent. of o-xylyl derivatives based upon the weight of the mixed xylidines.

6. The process of making an azo dye soluble in oil which comprises nitrating a xylene fraction of coal tar distillate which boils within the range of about 140° to about 145.5° C., reducing the resulting nitro-xylene mixture to a mixture of xylidines, converting the resulting xylidine mixture to a mixture of aminoazoxylenes, diazotizing the aminoazoxylene mixture, and coupling the resulting diazotized product with beta-naphthol in aqueous alkaline solution.

7. The process of making an azo dye soluble in oil which comprises nitrating a fraction of coal tar distillate which consists mainly of xylenes of which more than 90 per cent. is o-xylene, reducing the resulting nitro-xylene mixture to a mixture of xylidines, converting the resulting xylidine mixture to a mixture of aminoazoxylenes, diazotizing the amino-azoxylene mixture, and coupling the resulting diazotized product with beta-naphthol in aqueous sodium carbonate solution.

8. The process of making an azo dye soluble in oil which consists in diazotizing aminoazo-o-xylene and coupling the resulting compound with beta-naphthol.

9. A colored composition of matter comprising xylyl-azo-xylyl-azo-beta-naphthol of which at least 50 per cent. of the xylyl radicals are derivatives of o-xylene.

10. A colored composition of matter comprising a mixture of isomeric xylyl-azo-xylyl-azo-beta-naphthols of which at least 50 per cent. of the xylyl radicals are derivatives of o-xylene.

11. A colored composition of matter comprising a mixture of isomeric xylyl-azo-xylyl-azo-beta-naphthols of which at least 70 per cent. of the xylyl radicals are derivatives of o-xylene.

12. A colored composition of matter comprising a mixture of isomeric xylyl-azo-xylyl-azo-beta-naphthols of which more than 90 per cent. of the xylyl radicals are derivatives of o-xylene.

13. A composition of matter obtainable by the process of claim 6 and comprising a mixture of isomeric xylyl-azo-xylyl-azo-beta-naphthols, being in the dry state a bronzy, brownish powder insoluble in water, soluble in concentrated sulfuric acid to give a bluish green solution, and soluble in benzene to give a red solution.

14. Xylyl - azo - xylyl - azo - beta - naphthol in which the xylyl radicals are derivatives of o-xylene.

RALPH B. PAYNE.